United States Patent
Rombouts (10) Patent No.: US 12,253,047 B2
(45) Date of Patent: Mar. 18, 2025

(54) INTERNAL COMBUSTION ENGINE WITH MEANS FOR CONDENSATION FLUID REMOVAL

(71) Applicant: Cornelis Margaretha Maria Nicolaas Rombouts, Hoeven (NL)

(72) Inventor: Cornelis Margaretha Maria Nicolaas Rombouts, Hoeven (NL)

( * ) Notice: Subject to any disclaimer, the term of this patent is extended or adjusted under 35 U.S.C. 154(b) by 0 days.

(21) Appl. No.: 18/693,675

(22) PCT Filed: Jul. 18, 2022

(86) PCT No.: PCT/NL2022/050419
§ 371 (c)(1),
(2) Date: Mar. 20, 2024

(87) PCT Pub. No.: WO2023/048559
PCT Pub. Date: Mar. 30, 2023

(65) Prior Publication Data
US 2024/0271587 A1     Aug. 15, 2024

(30) Foreign Application Priority Data

Sep. 23, 2021   (NL) ..................................... 2029230

(51) Int. Cl.
*F02F 3/28*         (2006.01)
*F01M 5/00*        (2006.01)
(Continued)

(52) U.S. Cl.
CPC .............. *F02F 3/28* (2013.01); *F01M 5/005* (2013.01); *F01M 11/02* (2013.01); *F01M 11/03* (2013.01); *F16J 9/20* (2013.01)

(58) Field of Classification Search
CPC ..... F02F 3/28; F02F 5/00; F02F 11/00; F01M 5/005; F01M 11/02; F01M 11/03; F16J 9/20; F16J 9/203; F16J 9/206; F16J 9/06
See application file for complete search history.

(56) References Cited

U.S. PATENT DOCUMENTS 3,177,861 A * 4/1965 Quillian, Jr. .............. F02F 11/00
                                                                    92/82
4,011,797 A * 3/1977 Cornet ...................... F02F 3/22
                                                                    123/41.35
(Continued)

FOREIGN PATENT DOCUMENTS

| DE | 4007992 | 9/1990 |
| EP | 2175107 | 4/2010 |
| JP | S5654208 U | 5/1981 |

OTHER PUBLICATIONS

International Search Report and Written Opinion in International Application No. PCT/NL2022/050419, dated Sep. 26, 2022, 9 pages.

(Continued)

*Primary Examiner* — Grant Moubry
(74) *Attorney, Agent, or Firm* — KDW Firm PLLC (57) ABSTRACT

An internal combustion engine includes a cylinder defining a combustion chamber enclosed by a cylinder wall, a piston that is arranged inside the combustion chamber and moveable in a reciprocating motion away from and towards a crankshaft, and at least one first scraper ring defining an oil scraper ring that is arranged between the piston and the cylinder wall and configured to scrape oil off from the cylinder wall when the piston moves towards the crankshaft. The internal combustion engine further includes at least one second scraper ring defining a condensation fluid scraper ring that is arranged between the piston and the cylinder wall and configured to scrape a condensation fluid off from the cylinder wall when the piston moves away from the crankshaft.

25 Claims, 6 Drawing Sheets

(51) Int. Cl.
*F01M 11/02*  (2006.01)
*F01M 11/03*  (2006.01)
*F16J 9/20*   (2006.01)

(56) References Cited

U.S. PATENT DOCUMENTS

| | | | | |
|---|---|---|---|---|
| 4,614,150 | A | | 9/1986 | Deutschmann |
| 5,487,371 | A | * | 1/1996 | Beckman ............... F02M 25/06 |
| | | | | 123/572 |
| 2003/0075042 | A1 | * | 4/2003 | Gaiser ...................... F02F 3/00 |
| | | | | 92/231 |
| 2007/0261658 | A1 | * | 11/2007 | Abe ........................... F16J 1/09 |
| | | | | 123/193.6 |
| 2011/0100317 | A1 | * | 5/2011 | He ........................... F02F 3/003 |
| | | | | 123/193.6 |
| 2016/0040622 | A1 | * | 2/2016 | Donahue ................. F16J 9/064 |
| | | | | 123/193.4 |

OTHER PUBLICATIONS

International Preliminary Report on Patentability in International Application No. PCT/NL2022/050419, dated Dec. 22, 2023, 27 pages.

* cited by examiner

INTERNAL COMBUSTION ENGINE WITH MEANS FOR CONDENSATION FLUID REMOVAL

This application is a national stage filing under 35 U.S.C. 371 of pending International Application No. PCT/NL2022/0050419 filed Jul. 18, 2022, which claims priority to Netherlands patent application 2029230, filed Sep. 23, 2021, the entirety of which applications are incorporated by reference herein.

The present invention relates to an internal combustion engine.

In an internal combustion engine, combustion of fuel occurs with an oxidising agent in one or more combustion chambers of the internal combustion engine. Typically, the oxidising agent is oxygen stemming from ambient air that is let into the combustion chamber, along with fuel in the form of typically either diesel fuel or petrol. The fuel-air mixture is then compressed by means of an upwardly moving piston and ignited by means of a spark plug. Following ignition, expanding combustion gasses drive the piston downward, thus powering the internal combustion engine.

Recently, there has been an increased interest in fuelling internal combustion engines with types of fuel other than petroleum-based (e.g. petrol and diesel fuel) fuels. Examples of such fuels include natural gas, LPG (propane), renewable fuels such as bioethanol and biodiesel, and hydrogen. It is also known to utilise fuel mixtures in which one or more of such types fuels are mixed.

One property of the aforementioned fuels is that, due to their chemical structure, water ($H_2O$) forms a relatively large portion of their combustion products. A portion of this water remains in the combustion chamber after each successive combustion. Over time, this residual water may accumulate and result in increased wear of the internal combustion engine and interfere with the operation of the internal combustion engine; potentially resulting in damage.

Reference is made here to EP 2 175 107 A1, which discloses a large diesel engine and a method for lubricating such a large diesel engine. The diesel engine disclosed by this document comprises several piston rings. Of these piston rings, only one is a scraper ring, namely the one farthest from the combustion chamber. This single scraper ring is designed and arranged solely to scrape off oil, which is then collected via the exterior of the piston in a collection device at a lower end of a cylinder of the large diesel engine. This diesel engine has a cleaning device comprising a centrifuge to clean lubricant from particles or undissolved fluid components such as water. Mechanical filters can be arranged before the centrifuge and chemical cleaning devices are mentioned to removed targeted substances from the lubricant.

In addition, U.S. Pat. No. 4,614,150 A discloses a piston with two compression rings and one oil scraper ring arranged in an annular groove. An oil discharge channel conducts the oil scraped off from the cylinder wall by the oil scraper ring from the annular groove back into the crankcase. A similar piston is disclosed in DE 40 07 922 A1.

The objective of the present invention is to provide an internal combustion engine with means through which the here above described problem is obviated or at least abated.

This objective of the present invention is achieved with an internal combustion engine comprising a cylinder defining a combustion chamber enclosed by a cylinder wall, a piston that is arranged inside the combustion chamber and moveable in a reciprocating motion away from and towards a crankshaft, and a first scraper ring defining an oil scraper ring that is arranged between the piston and the cylinder wall and configured to scrape lubricating oil off from the cylinder wall when the piston moves towards the crankshaft, wherein the internal combustion engine further comprises at least a second scraper ring defining a condensation fluid scraper ring that is arranged between the piston and the cylinder wall and configured to scrape a condensation fluid off from the cylinder wall when the piston moves away from the crankshaft.

During operation of the internal combustion engine according to the present invention, gaseous water (vapour) may be one of the combustion products resulting from the combustion of fuel. A portion of this water vapour will remain in its gaseous state and is therefore easily removed from the combustion chamber during an exhaust stroke of the internal combustion engine. However, a further portion of this water vapour comes into contact with the cylinder wall of the cylinder. In particular when this cylinder wall is still relatively cold when the internal combustion engine has only just been started and has not warmed up yet. On this relatively cold cylinder wall, the water vapour condensates to form a film of liquid water extending over a surface of the cylinder wall.

According to the present invention, this film of residual water is at least in part scraped off the cylinder wall by means of the least one condensation fluid scraper ring, allowing it to be successively removed from the combustion chamber of the internal combustion engine without coming into contact with the lubricating oil that is scraped off by the first (oil scraper) ring. As such, with the internal combustion engine according to the present invention as defined hereabove no mixing of the lubricating oil and the condensed water vapour takes place.

Contrary to the large diesel engine known from EP 2 175 107 A1, the internal combustion engine according to the present invention comprises at least one second scraper ring defining a condensation fluid scraper ring. This condensation fluid scraper ring is arranged between the piston and the cylinder wall and configured to scrape a condensation fluid off from the cylinder wall when the piston moves away from the crankshaft.

In preferred embodiments of the internal combustion engine according to the present invention, the piston comprises a drain channel extending from the condensation fluid scraper ring for draining condensation fluid scraped off by the condensation fluid scraper ring. This drain channel extending from the condensation fluid scraper ring for draining condensation fluid is distinct from an oil drain channel arranged adjacent to, and extending from, the oil scraper ring. As such, the scraped off lubrication oil and the scraped off condensed remain substantially separated from one another as both liquids are drained from the piston and the cylinder.

In preferred embodiments of the internal combustion engine according to the present invention, the drain channel moreover extends out of the piston in the direction of the crankshaft.

In preferred embodiments of the internal combustion engine according to the present invention, the drain channel is fluidly connected with an engine lubrication system.

In preferred embodiments of the internal combustion engine according to the present invention, a fluid-oil separator is arranged downstream of the drain channel and configured to separate the scraped off condensation fluid from residual lubricating oil present therein.

In preferred embodiments of the internal combustion engine according to the present invention, the fluid-oil separator is configured to separate condensation fluid from oil based on evaporation of the condensation fluid.

In preferred embodiments of the internal combustion engine according to the present invention, the fluid-oil separator comprises a temperature control.

In preferred embodiments of the internal combustion engine according to the present invention, the fluid-oil separator is fluidly connected with a lubrication system of the internal combustion engine.

In preferred embodiments of the internal combustion engine according to the present invention, the fluid-oil separator is configured to feed lubricating oil separated from the condensation fluid to an oil sump.

In preferred embodiments of the internal combustion engine according to the present invention, the fluid-oil separator comprises a gas outlet fluidly connected with an inlet channel of the cylinder.

In preferred embodiments of the internal combustion engine according to the present invention, the internal combustion engine further comprises a gas inlet configured to introduce ambient air into the fluid-oil separator.

In preferred embodiments of the internal combustion engine according to the present invention, a constriction is provided at a point where the gas outlet of the fluid-oil separator debouches into the inlet channel of the cylinder.

In preferred embodiments of the internal combustion engine according to the present invention, the constriction comprises a Venturi tube-like shape.

In preferred embodiments of the internal combustion engine according to the present invention, the oil scraper ring and the condensation fluid scraper ring are oriented in opposite directions.

In preferred embodiments of the internal combustion engine according to the present invention, the at least one condensation fluid scraper ring is arranged closer to a piston crown of the piston than the at least one oil scraper ring.

The above stated objective is furthermore achieved with a piston of or for an internal combustion engine as disclosed herein. Such a piston may be installed in a prior-art internal combustion engine (retrofitting) to achieve at least some of the advantages according to the present invention.

The present invention will be elucidated here below with reference to the appended drawing, in which.

An internal combustion engine according to the present invention comprises a plurality of cylinders of which one exemplary cylinder 1 is depicted in FIG. 1A to 1D. The cylinder 1 comprises a cylinder wall 15 defining a combustion chamber 3, which is enclosed by said cylinder wall 15.

A piston 2 is received inside the combustion chamber 3 of the cylinder 1. During operation of the internal combustion engine, the piston 2 performs a reciprocating motion in the combustion chamber 3 away from and towards a crankshaft 22 in a crankcase 21 situated beneath the cylinder 1, as may be discerned from FIG. 3.

The cylinder 1 comprises at its top end an inlet channel 9 for the introduction of a fuel-oxidiser mixture into the combustion chamber 3 and an exhaust outlet 10 for guiding exhaust gasses out of the combustion chamber 3 after combustion. The inlet channel 9 and the exhaust outlet 10 respectively comprise valves 14 and 14' for selectively closing and opening the inlet channel 9 and exhaust outlet 10 during successive engine strokes. A spark plug 13 is provided to ignite the fuel mixture within combustion chamber 3 for powering of the internal combustion engine.

During operation of the internal combustion engine, the cylinder 1 continuously performs one of a number of successive engine strokes, during which piston 2 undergoes an upward or downward motion within the combustion chamber 3 of the cylinder 1. An operational cycle of the internal combustion engine consists of an intake stroke, followed by a compression stroke, a combustion stroke and finally an exhaust stroke.

Figure 1A:
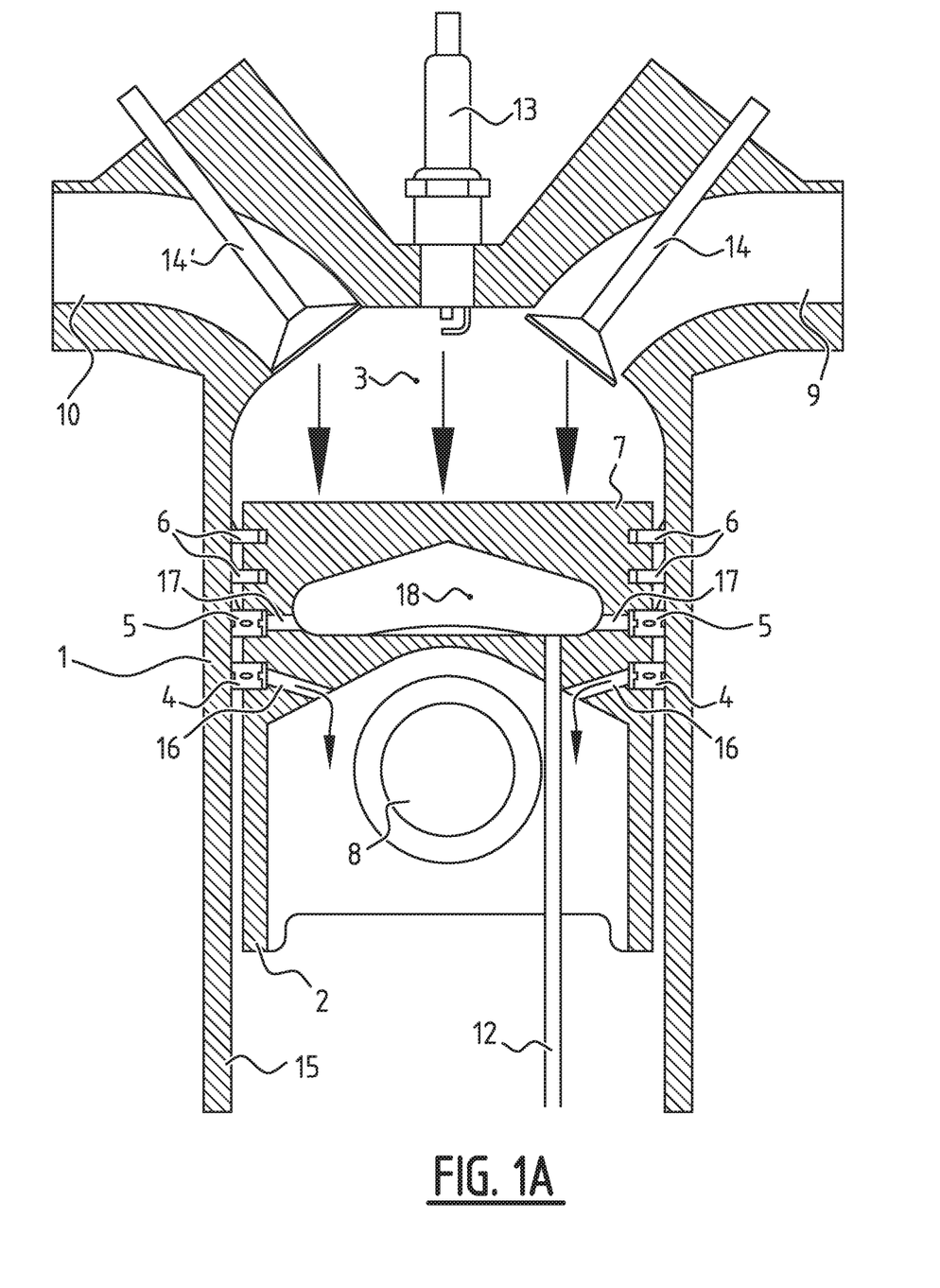
FIGS. 1A, 1B, 1C and 1D illustrate a cross-section of a piston and cylinder comprised by an internal combustion engine according to the present invention during exemplary successive engine strokes.

In the appended figures, FIG. 1A depicts the piston 2 undergoing a downward motion towards a crankcase during an intake stroke with the valve 14 in an opened state for the introduction of the fuel-oxidiser mixture. The piston 2 undergoes a downward motion within cylinder 1. The fuel-oxidiser mixture is introduced into the combustion chamber 3 via the inlet channel 9 with valve 14 being kept open and valve 14' remaining closed. Once the piston 2 reaches a predefined lowest point within the interior of cylinder 1, valve 14 is closed to inhibit any further introduction of the fuel-oxidiser mixture.

Figure 1B:
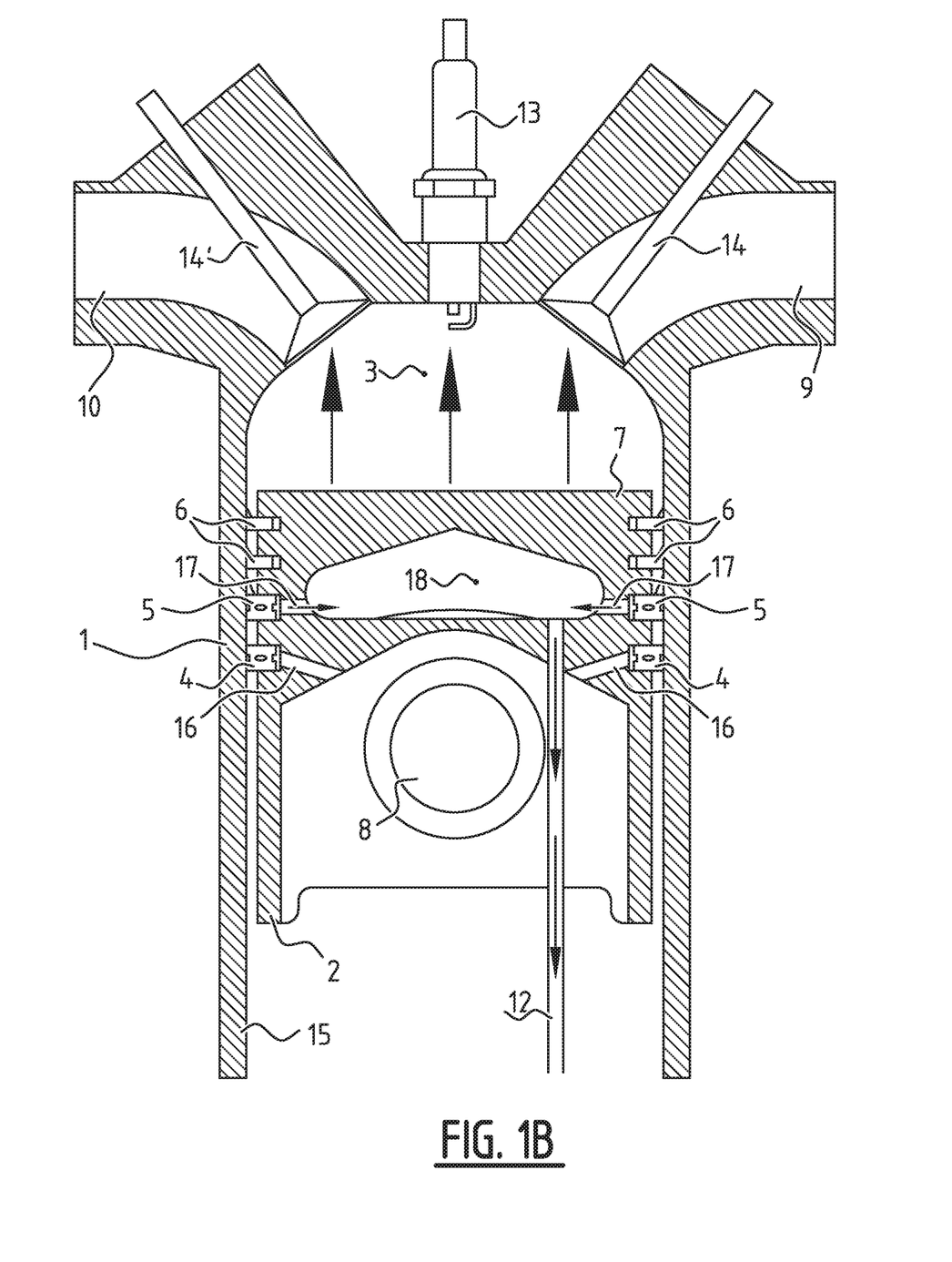

The intake stroke of cylinder 1 is followed by a compression stroke as depicted in FIG. 1B. During this intake stroke, both of valves 14 and 14' remain closed and the piston 2 undergoes an upward motion within the interior of cylinder 1. The internal volume of the combustion chamber 3 is thus reduced, thereby compressing the fuel-oxidiser mixture located therein. When the piston 2 has reached a predefined highest point within the interior of cylinder 1—at which point the combustion chamber 3 comprises its smallest volume—the compressed fuel-oxidiser mixture is brought to ignition by means of the spark plug 13.

Figure 1C:
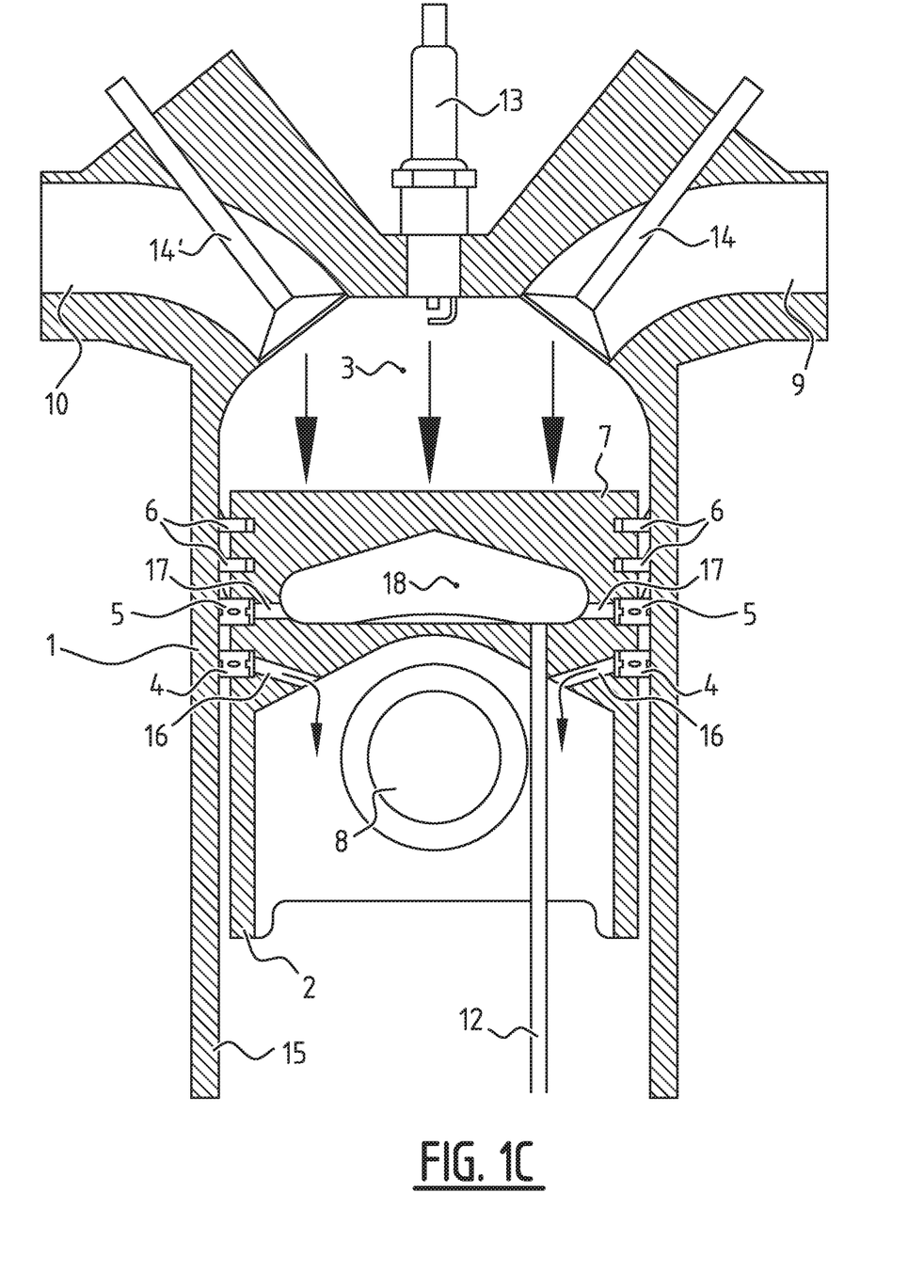

The compression stroke is followed by a combustion stroke upon, as illustrated in FIG. 1C. During the combustion stroke, the fuel-oxidiser mixture within combustion chamber 3 combusts and the resulting rapidly expanding combustion gasses force the piston 2 in the downward direction, thereby powering the internal combustion engine. The piston 2 continues to travel downward within cylinder 1 until the aforementioned predefined lowest point within the interior of cylinder 1 is once again reached.

Figure 1D:
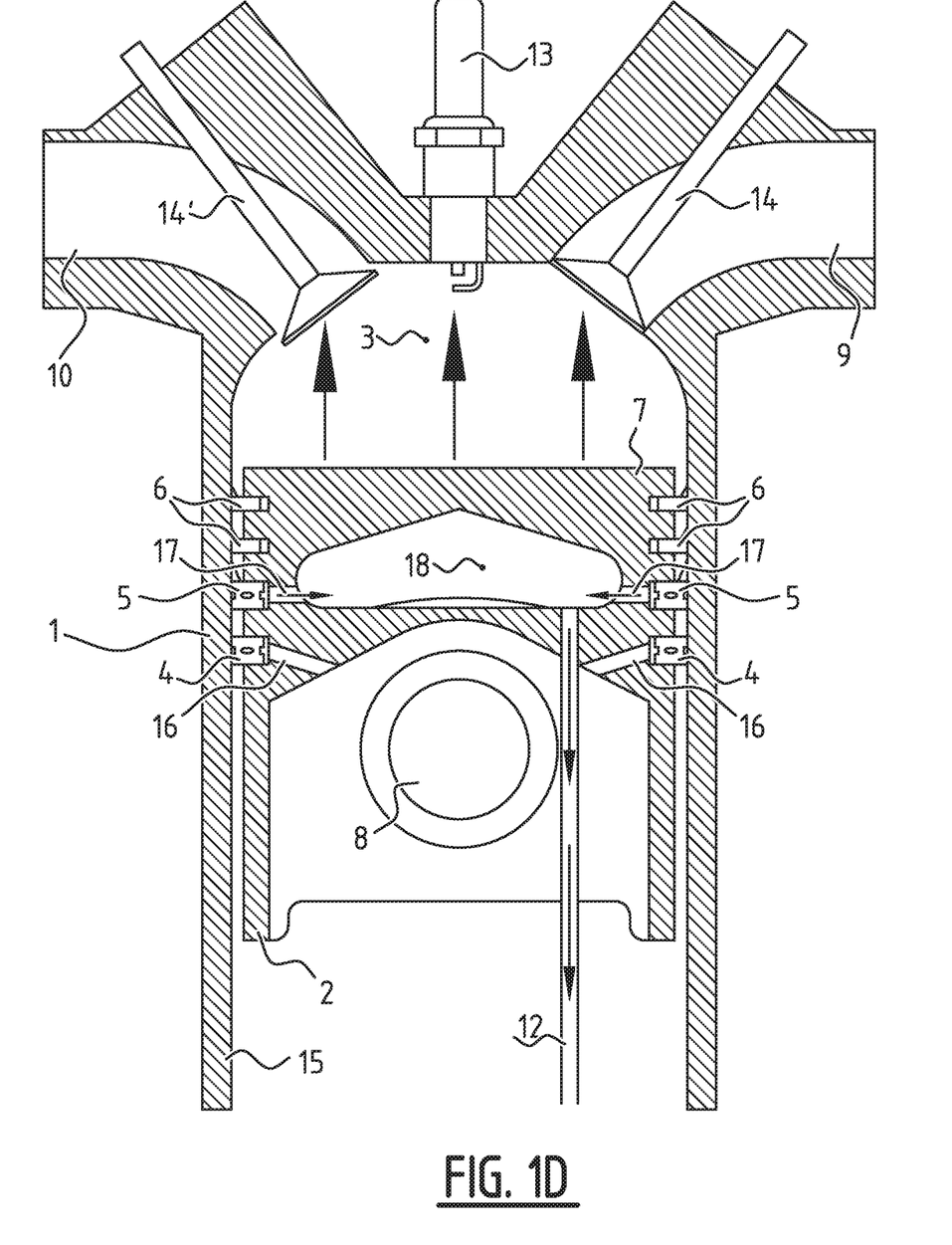

Lastly, during a subsequent exhaust stroke as is depicted in FIG. 1D, the valve 14 of the inlet channel 9 is kept closed while—in contrast to FIG. 1B—the valve 14' of the exhaust outlet 10 is opened. The piston 2 again moves upward within the interior of the cylinder 1 while forcing combustion gasses present within combustion chamber 3 outward via the exhaust outlet 10. Once the piston 2 has again reached the aforementioned predefined highest point within the interior of cylinder 1, the exhaust stroke is complete. The valve 14' of the exhaust outlet 10 may then be closed and the valve 14 of the inlet channel 9 opened, after which the piston 2 may perform a further intake stroke as described here above, to subsequently repeat the entire operating cycle of the internal combustion engine.

To enable the above described operation of the internal combustion engine, lubricating oil is provided to reduce mechanical friction between in particular the contacting surfaces of the cylinder 1 and the piston 2. For example, an oil dispensing nozzle (not shown) may be provided to continuously or periodically apply lubricating oil into a lower section of the cylinder 1 closest to the crank shaft 22.

Figure 2:
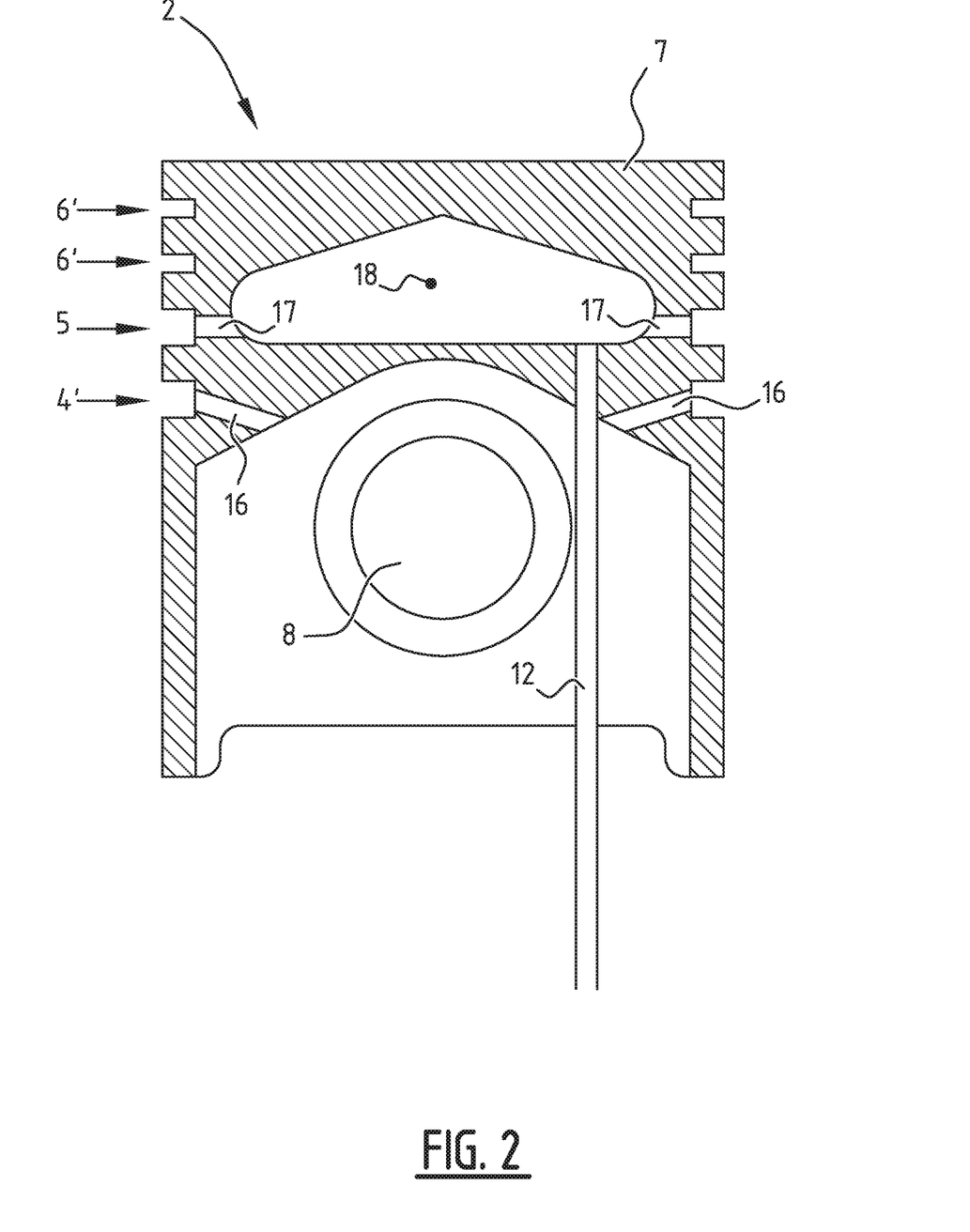
FIG. 2 depicts a cross section the piston of FIG. 1A to FIG. 1D in isolation.

As is depicted in FIG. 1A to 1D, a plurality of piston rings 4, 5 and 6 is provided between the piston 2 and the cylinder wall 15. In the depicted embodiments four piston rings 4, 5 and 6 are provided, but the present disclosure is not limited thereto. As is best illustrated in FIG. 2, each of the plurality of piston rings 4, 5 and 6 may be arranged in one of corresponding grooves 4', 5' and 6' that are disposed on an outer circumference of the piston 2.

The plurality of piston rings 4, 5 and 6 includes compression rings 6. The compression rings 6 are configured and appropriately arranged to seal a gap between the (interior) cylinder wall 15 of the cylinder 1 and the piston 2, to thereby allow the above described operation of the internal combustion engine. In the depicted embodiment, an exemplary number of two compression rings 6 are arranged at the top of the piston 2 and closest to a piston crown 7 of the piston 2.

Moreover, a first scraper ring 4 defining an oil scraper ring 4 (also known as an "oil control ring") is provided between the piston 2 and the cylinder wall 15 for regulating the distribution of lubricating oil. The first scraper ring 4—which is henceforth referred to as an oil scraper ring 4—is configured to assist in distributing lubricating oil over the interior cylinder wall 15 of the cylinder 1 during reciprocal motion of the piston 2 as described here above. Simultaneously, the oil scraper ring 4 is configured scrape off any excess lubricating oil that may otherwise interfere with the operation of the internal combustion engine. For this purpose, the oil scraper ring 4 is arranged adjacent to at least one oil drain channel 16 in the piston 2, which may be at least partially formed in the groove 4' into which the oil scraper ring 4 is arranged. The oil drain channel 16 may extend around at least part of the circular circumference of the piston 2. Moreover, a plurality of oil drain channels 16 may be provided.

Figure 3:
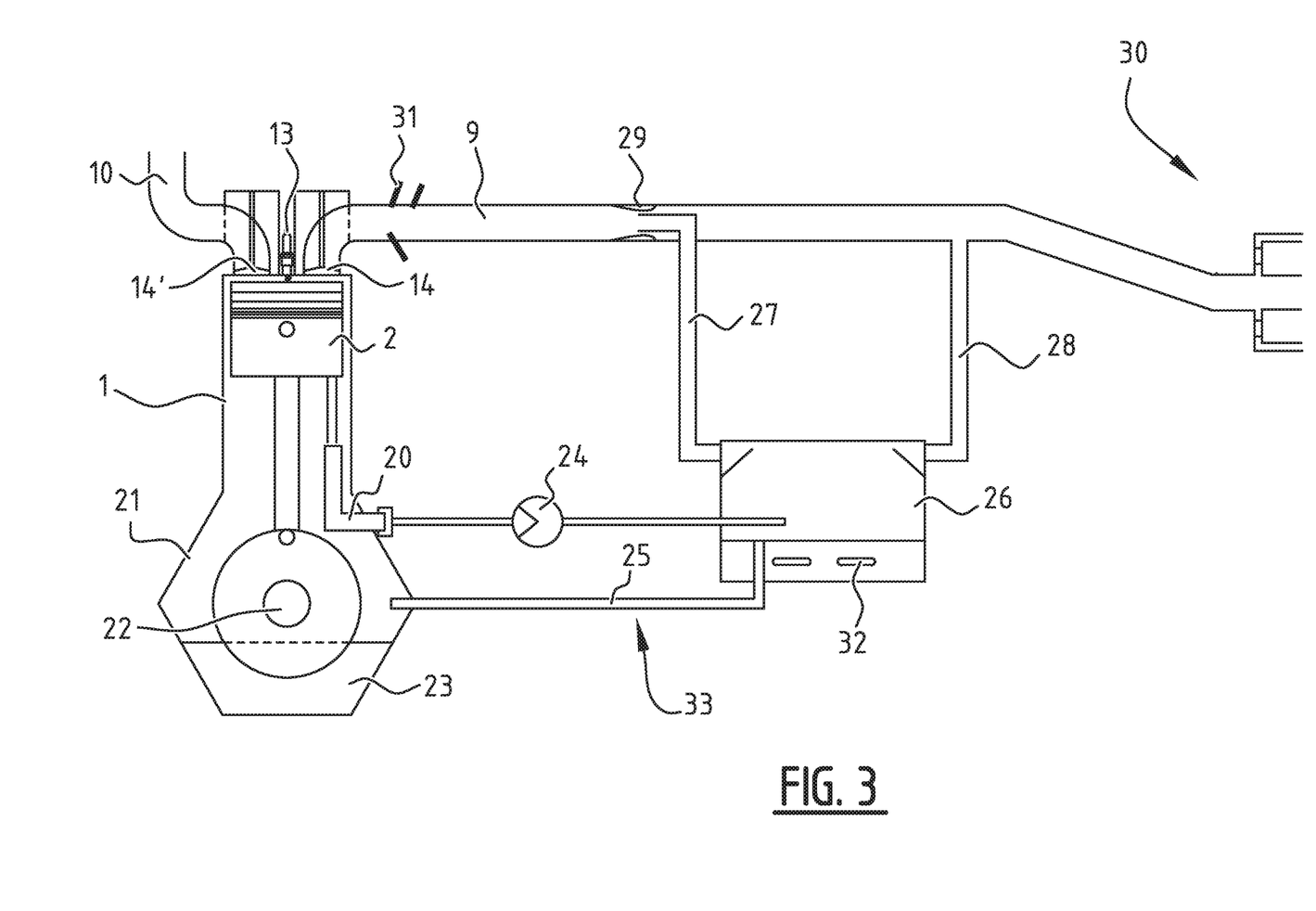
FIG. 3 shows a schematic partial representation of an internal combustion engine according to the present invention.

After flowing through drain channel 16, excess lubricating oil may fall into an oil sump 23 within a crankcase 21 as illustrated in FIG. 3. A lubrication system 33 may moreover be provided, which will be elucidated here below with reference to FIG. 3.

According to certain embodiments of the present invention, the oil scraper ring 4 is configured to scrape off lubricating oil from the cylinder wall 15 during a downward motion of the piston 2 towards the crankshaft 22 housed in a crank case 21. That is to say, during intake stroke or a combustion stroke of the internal combustion engine as is depicted in FIGS. 1A and 1C, respectively. In these figures, the flow of scraped off lubricating oil is indicated by the arrows.

The skilled person is well aware of the requirements with respect to the shape and/or configuration of the oil scraper ring 4 to achieve scraping off oil from the cylinder wall 15 during downward motion of the piston 2.

As stated in the introductory part of the present disclosure here above, certain fuels or fuel mixtures may result in a relatively large amount of water after being present in combustion chamber 3 after combustion. In particular natural gas, LPG (propane), renewable fuels such as bioethanol and biodiesel, and hydrogen are known to have a relatively large portion of their combustion products in the form of gaseous water in comparison to petrol and diesel fuel.

A significant portion of this gaseous water will remain in its gaseous state. As such, it is easily driven out of the combustion chamber 3 during a here above described exhaust stroke of the internal combustion engine. Nevertheless, a portion of this gaseous water will come into contact with the cylinder wall 15 of the cylinder. Typically, at least part of this cylinder wall 15 is relatively cold in comparison to the hotter combustion gasses resulting from the combustion of the fuel mixture, in particular when the internal combustion engine has only just been started, has been running for only a short amount of time or when an ambient temperature of the internal combustion engine is particularly low. Consequently, at least some of the gaseous water (water vapour) condensates on the relatively cold cylinder wall 15 to form liquid water. In the sense of the present disclosure, this liquid water is referred to as condensation fluid forming small droplets or a thin film of fluid on the cylinder wall 15. Due to this condensation fluid being in a liquid state, it is not forced out of the combustion chamber 3 during a subsequent exhaust stroke of the internal combustion engine.

Over the course of several engine cycles, this condensation fluid may accumulate to the point at which it inhibits the above described normal operation cycle of the internal combustion engine. To prevent such problems and remove this condensation fluid from the combustion chamber 3, the plurality of piston rings 4, 5 and 6 moreover comprises at least one second scraper ring 5 defining a condensation fluid scraper ring 5.

The condensation fluid scraper ring 5 is likewise arranged between the piston 2 and the cylinder wall 15 and configured to scrape condensation fluid off from the cylinder wall 15 during reciprocal movement of the piston 2, in particular during an upward stroke of the piston away from the crankshaft 22. The condensation fluid scraper ring 5 may function in a manner that is comparable to that of the oil scraper ring 4 with respect to the scraping off of lubricating oil from the cylinder wall 15.

The condensation fluid scraper ring 5 may be oriented in a direction opposite to a direction in which the oil scraper ring 4 is oriented, and in particular may be configured to scrape condensation fluid from the cylinder wall 15 when moving in a direction within cylinder 1 opposite a direction in which the oil scraper ring 4 scrapes oil from the cylinder wall 15. More in particular, the condensation fluid scraper ring 5 may be configured to scrape the condensation fluid off from the cylinder wall 15 when the piston 2 moves upwardly away from the crankcase 21 and the crankshaft 22. In other words, the condensation fluid scraper ring 5 is preferably configured to scrape off condensation fluid from the cylinder wall 15 during an exhaust stroke and/or a compression stroke of the cylinder 1, whereas the oil scraper ring 4 in contrast is preferably configured to scrape off lubricating oil from the cylinder wall 15 during an intake stroke and/or combustion stroke of the internal combustion engine. As such, the oil scraper ring 4 and the condensation fluid scraper ring 5 are preferably configured to respectively scrape off lubricating oil and condensation fluid when moving in opposing directions.

The oil scraper ring 4 and the condensation fluid scraper ring 5 may each comprise a respective shape configured to adequately perform their respective scraping actions in the respective movement directions of the piston 2. Alternatively, the oil scraper ring 4 and the condensation fluid ring 5 may comprise identical shapes and be oriented in opposing directions relative to one another. According to yet further configurations, the oil scraper ring 4 and the condensation fluid ring 5 may be substantially identical, with the oil scraper ring 4 and the condensation fluid ring 5 being reliant on the presence of lubricating oil or condensation fluid within the cylinder 1 to perform their respective functions.

The condensation fluid scraper ring 5 is preferably arranged closer to a piston crown 7 of the piston 2 than the at least one oil scraper ring 4. The fluid scraper ring 5 is moreover preferably arranged between the oil scraper ring 4 and the at least one compression ring 6.

Referring now to FIG. 2, the condensation fluid scraper ring 5 is arranged in an appropriately arranged groove 5'. Groove 5' may extend around an outer circumference of the piston 2. Adjacent to groove 5' there is arranged a condensation fluid drain channel 17 extending inwardly from the groove 5' into the piston 2. Condensation fluid scraped off from the cylinder wall 15 by the condensation fluid scraper ring 5 is drained via condensation fluid drain channel 17.

The condensation fluid drain channel 17 for draining scraped off condensation fluid is distinct from the here above described oil drain channel 16, which ensures that the scraped off oil and the scraped of condensation fluid do not mix after these respective fluids have been scraped off the cylinder wall by, respectively, the first (oil) scraper ring 4 and the second (condensation fluid) scraper ring 5.

In the depicted embodiments, the condensation fluid drain channel 17 debouches into a chamber 18 defining a hollow interior of the piston 2. The chamber 18 is in turn fluidly connected with a drain channel 12 extending downwardly out of the piston 2. Consequently, condensation fluid scraped off from the cylinder wall 15 by means of condensation fluid scraper ring 5 flows out of the cylinder 1 via fluid drain channel 17, chamber 18 and drain channel 12. Problems associated with the presence of condensation fluid within or near the combustion chamber 3 may thus be obviated or abated. In addition, it is by and large prevented that significant amounts of liquid water end up in the lubricating oil and/or the oil sump 23.

It is emphasised here that the embodiments depicted in the appended figures should be interpreted as being merely exemplary and that identical or similar results may be achieved with comparable but alternative configuration of the piston 2. For example, while the presence of chamber 18 comprises the advantages reductions in weight and material, it is conceivable for this chamber 18 to be omitted and instead be replaced with a more narrow conduit (not shown) directly connecting condensation fluid drain channel 17 with drain channel 12.

FIG. 3 depicts a schematic partial representation of an internal combustion engine comprising at least the cylinder 1 with therein the piston 2 as described with reference to FIG. 1A, 1B and FIG. 2.

As illustrated in FIG. 3, the piston 2 is received in the cylinder 1 to thereby define the combustion chamber 3 illustrated in the foregoing figures. The piston 2 is moreover connected to a crankshaft 2 arranged within the crankcase 21 by means of a connecting rod connected to the connection means 8 of the piston 2. The crankcase 21 moreover comprises the oil sump 23 that forms part of a lubrication system 33 of the internal combustion engine.

Still referring to FIG. 3, there is provided a connector 20 that is fluidly connected to the drain channel 12 described with reference to the foregoing figures. The connector 20 may moreover comprise a motor for enabling an adequate flow of fluid. Alternatively or in addition, an auxiliary pump 24 may be provided downstream of the connector 20 for this purpose. The connector 20 fluidly connects the drain channel 12 with a fluid-oil separator 26.

As described with reference to the foregoing figures, condensation fluid flows out of the piston 2 via drain channel 12. It has been determined that in practice, it cannot be entirely prevented that this condensation fluid comprises at least some residual lubricating oil.

The mixture of lubricating oil and condensation fluid is fed to the fluid-oil separator 26 via connector 20. The fluid-oil separator 26 is configured to separate the (residual) lubricating oil from the condensation fluid. According to certain embodiments, this separation may be based at least on part on the immiscibility of the lubricating oil and the condensation fluid, which as a result of said immiscibility are inclined to form two separate and distinct layers of condensation fluid and oil within the fluid-oil separator 26, allowing for a relatively easy separation. Lubricating oil that has been separated from the condensation fluid may be returned to the oil sump 23 via an oil return conduit 25 fluidly connecting the fluid-oil separator 26 to the oil sump 23.

According to more preferred embodiments, the fluid-oil separator 26 is alternatively or additionally configured to separate the condensation fluid and the lubricating oil based on evaporation of at least the condensation fluid. In these embodiments, the fluid-oil separator 26 comprises a heating element 32 configured to heat the mixture of condensation fluid and lubricating oil to an elevated temperature. At this elevated temperature, the condensation fluid will evaporate, allowing it to exit the fluid-oil separator 26 via gas outlet 27.

The fluid-oil separator 26 preferably comprises a temperature control to maintain a predefined temperature therein.

While the evaporated condensation fluid exiting the fluid-oil separator 26 primarily consists of water vapour, some residual lubricating oil may nevertheless still be present in a evaporated state. For environmental reasons, the gaseous flow of evaporated condensation fluid comprising residual lubricating oil exiting fluid-oil separator 26 is preferably fed back into the combustion chamber 3, so that the any residual lubricating oil is combusted there.

The gas outlet 27 of the fluid-oil separator 26 thus extends into the inlet channel 9. A constriction 29—of which the shape preferably resembles a Venturi tube—may be arranged at the section where the gas outlet 27 debouches into the inlet channel 9. The constriction 29 ensures that a relatively increased flow velocity of gas, including water vapour (condensation fluid) and gaseous lubricating oil, flows from the fluid-oil separator 26 via the gas outlet 27 into the inlet channel 9 and eventually the cylinder 1.

As can moreover be discerned from FIG. 3, there is provided a gas inlet 28 upstream of the constriction 29 and providing a further connection between the fluid-oil separator 26 and inlet channel 9. The gas inlet 28 provides a constant introduction of air that is required for the above described gaseous flow from the fluid-oil separator 26 to the inlet channel 9 to take place. The gas inlet 28 thereby moreover prevents air from the crankcase 21 being sucked in by the fluid-oil separator 26.

Further upstream of the gas inlet 28 there is arranged an air filter 30 that is configured to filter any ambient air before it is taken in by the internal combustion engine. FIG. 3 moreover depicts an optional fuel injector 31 configured to inject a fuel mixture into inlet channel 9 from which it may flow into the combustion chamber 3 of the cylinder 1. Alternatively, the internal combustion engine may comprise a carburettor (not shown).

It is noted here that the scope of protection for the developments described in the present disclosure are by no means limited to any particular feature of the embodiments described above and illustrated in the appended drawing.

While the present invention has been elucidated with reference to a four-stroke, spark-ignition, engine, these exemplary embodiments should not be understood as being limitative to the present disclosure. Indeed, it is entirely conceivable that the general principles of the present invention as elucidated here above may likewise be applied in a two-stroke engine, a six-stroke engine, and a compression-ignition engine. In light of this, the skilled person will acknowledge that according to the type of internal combustion engine to which the present invention is applied, some of the engine components discussed here above may be omitted while alternative engine components may be present.

The invention claimed is:

1. A piston for arranging in a cylinder of an internal combustion engine, the piston comprising:
    a first groove arranged on an outer circumference of the piston to receive a first scraper ring for scraping off oil from a cylinder wall of the cylinder;
    a second groove arranged on the outer circumference of the piston to receive a second scraper ring for scraping off condensation fluid from the cylinder wall, wherein the second groove is arranged closer to a piston crown of the piston than the first groove;
    a condensation drain channel in fluid communication with the second groove and extending inwardly from the second groove into a chamber of the piston to drain condensation fluid scraped-off by the second scraper ring;
    an oil drain channel in fluid communication with the first groove and extending inwardly from the first groove into an interior portion of the piston that is fluidly separate from the chamber;
    wherein the oil drain channel is separated from the condensation drain channel to separate oil scraped-off by the first scraper ring from condensation fluid scraped-off by the second scraper ring.

2. The piston of claim 1, further comprising at least one of:
    the first scraper ring arranged in the first groove; and
    the second scraper ring arranged in the second groove.

3. The piston of claim 1, further comprising a third groove arranged on the outer circumference of the piston to receive a compression ring, wherein the third groove is arranged closer to the piston crown than the second groove.

4. The piston of claim 3, further comprising the compression ring arranged in the third groove.

5. The piston of claim 1, wherein the oil drain channel is arranged in the piston adjacent to the first groove for draining oil scraped off by the first scraper ring, wherein the condensation drain channel is distinct from the oil drain channel to drain condensation fluid and oil through separate channels.

6. The piston of claim 1, wherein the chamber defines a hollow interior of the piston.

7. A method of providing an internal combustion engine comprising installing the piston according to claim 1 in an internal combustion engine.

8. A use of the piston according to claim 1 for retrofitting internal combustion engines.

9. An internal combustion engine, comprising:
    a cylinder defining a combustion chamber enclosed by a cylinder wall; and
    the piston according to claim 1 with a first scraper ring arranged in the first groove and a second scraper ring arranged in the second groove,
    wherein the piston is arranged inside the combustion chamber and moveable in a reciprocating motion away from and towards a crankshaft.

10. The internal combustion engine according to claim 9, wherein the first scraper ring and the second scraper ring are oriented in opposite directions.

11. The internal combustion engine according to claim 9, further comprising at least one compression ring that is arranged between the piston and the cylinder wall to seal a gap therebetween.

12. The internal combustion engine according to claim 11, wherein the at least one compression ring is arranged closer to the piston crown than the second scraper ring.

13. The internal combustion engine according to claim 9, wherein the oil drain channel is fluidly connected with an engine lubrication system.

14. A piston for an internal combustion engine, the piston comprising:
    a first groove arranged on an outer circumference of the piston to receive a first scraper ring;
    a second groove arranged on the outer circumference of the piston to receive a second scraper ring, wherein the second groove is arranged closer to a piston crown of the piston than the first groove; and
    a drain channel arranged adjacent to the second groove and extending inwardly from the second groove into the piston;
    wherein the drain channel is fluidly connected with a further drain channel extending downwardly out of the piston.

15. A method of providing an internal combustion engine comprising installing the piston according to claim 14 in an internal combustion engine.

16. A use of the piston according to claim 14 for retrofitting internal combustion engines.

17. An internal combustion engine, comprising:
    a cylinder defining a combustion chamber enclosed by a cylinder wall;
    a piston comprising a first groove arranged on an outer circumference of the piston to receive a first scraper ring; a second groove arranged on the outer circumference of the piston to receive a second scraper ring, wherein the second groove is arranged closer to a piston crown of the piston than the first groove; and a drain channel arranged adjacent to the second groove and extending inwardly from the second groove into the piston; wherein a first scraper ring is arranged in the first groove and a second scraper ring is arranged in the second groove, and wherein the piston is arranged inside the combustion chamber and moveable in a reciprocating motion away from and towards a crankshaft; and
    a fluid-oil separator arranged downstream of the drain channel and configured to separate the scraped off condensation fluid from residual or remaining lubricating oil present therein.

18. The internal combustion engine according to claim 17, wherein the fluid-oil separator is configured to separate condensation fluid from oil based on evaporation of the condensation fluid.

19. The internal combustion engine according to claim 18, wherein the fluid-oil separator comprises a heating element configured to heat the mixture of condensation fluid and lubricating oil to an elevated temperature.

20. The internal combustion engine according to claim 17, wherein the fluid-oil separator is fluidly connected with a lubrication system of the internal combustion engine.

21. The internal combustion engine according to claim 20, wherein the fluid-oil separator is configured to feed lubricating oil separated from the condensation fluid to an oil sump.

22. The internal combustion engine according to claim 17, wherein the fluid-oil separator comprises a gas outlet fluidly connected with an inlet channel of the cylinder.

23. The internal combustion engine according to claim 22, wherein a constriction is provided at a point where the gas outlet of the fluid-oil separator debouches into the inlet channel of the cylinder.

24. The internal combustion engine according to claim 23, wherein the constriction comprises a Venturi tube-like shape.

25. The internal combustion engine according to claim 17, further comprising a gas inlet configured to introduce ambient air into the fluid-oil separator.

\* \* \* \* \*